Nov. 6, 1934.  T. BROWN  1,980,033
TRACTOR
Filed Nov. 2, 1931   2 Sheets-Sheet 1
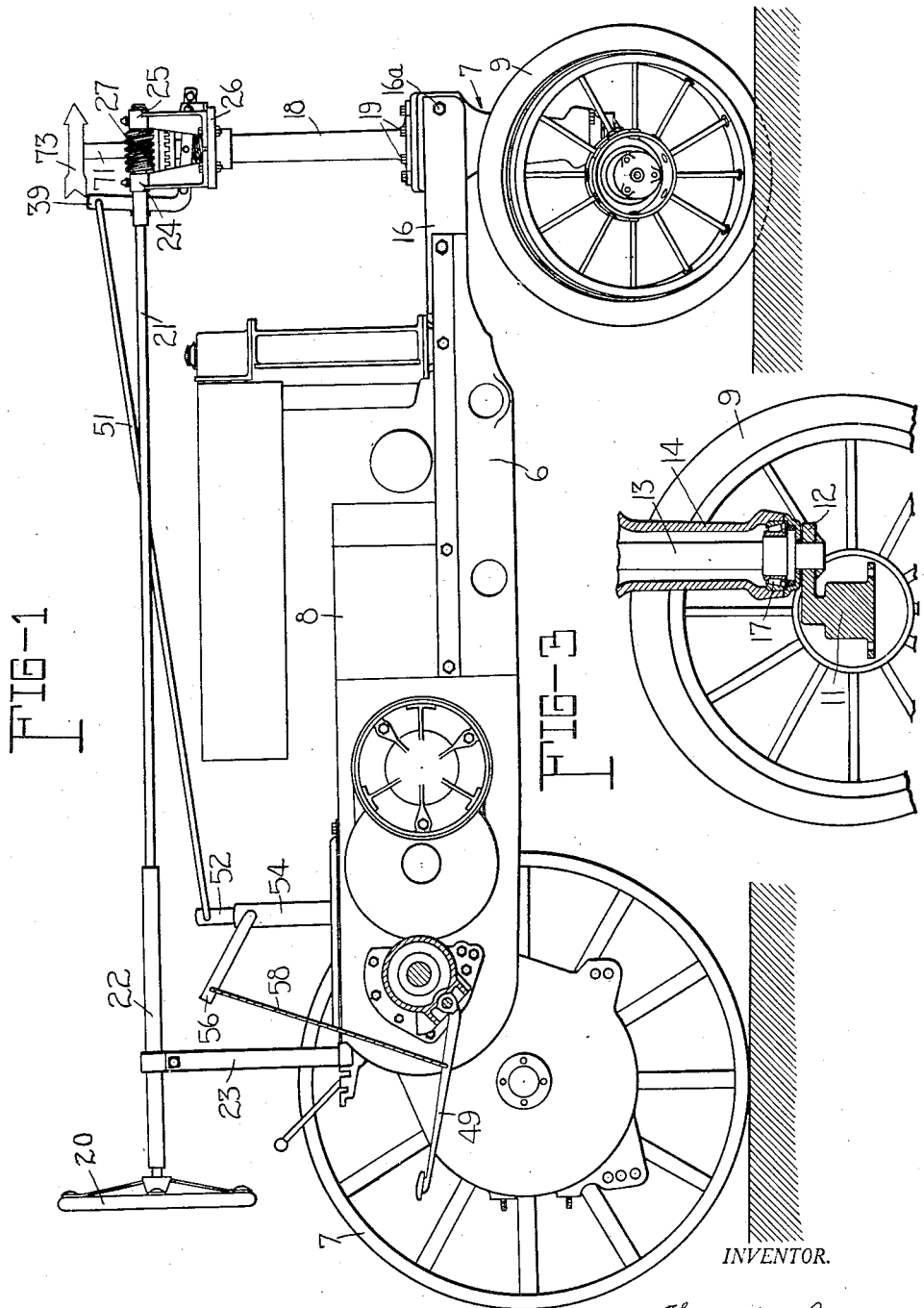
INVENTOR.
BY Theophilus Brown,
ATTORNEYS.

Nov. 6, 1934.　　　T. BROWN　　　1,980,033
TRACTOR
Filed Nov. 2, 1931　　　2 Sheets-Sheet 2
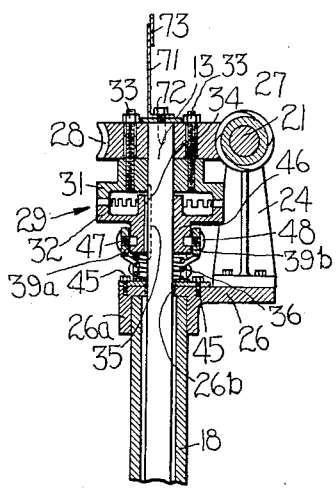
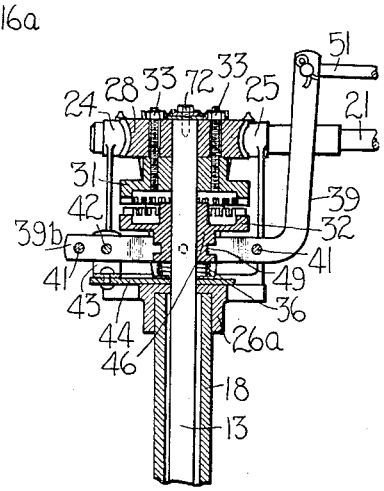
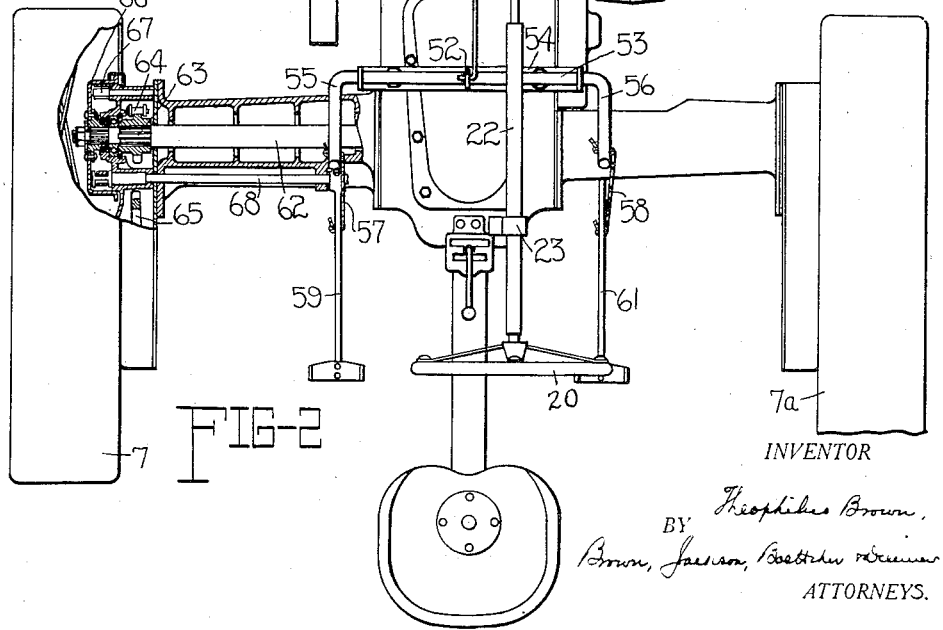
INVENTOR
Theophilus Brown,
BY Brown, Jackson, Boettcher & Dienner
ATTORNEYS.

Patented Nov. 6, 1934

1,980,033

UNITED STATES PATENT OFFICE 1,980,033

TRACTOR

Theophilus Brown, Moline, Ill., assignor to Deere & Company, Moline, Ill., a corporation of Illinois Application November 2, 1931, Serial No. 572,470

12 Claims. (Cl. 180—17)

The present invention relates to tractors, and has special reference to improved mechanism whereby the steering of the tractor in making sharp turns is greatly facilitated.

In the use of tractors generally, and particularly farm tractors, difficulty is often encountered in steering the tractor around sharp turns, such, for instance, as are necessary to be made at the ends of rows when operating a planter, cultivator or other implement, owing to the fact that the front dirigible wheels are at all times under the direct control of the hand steering wheel and the burden rests on the operator to turn said dirigible wheels by means of the hand steering wheel a sufficient amount and rapidly enough to make such turns properly. In tractors ordinarily used for farm work separate brake mechanism is usually provided for each of the traction wheels, which brake mechanisms are operated by means of foot pedals conveniently positioned at opposite sides of the driver's seat on the tractor. In such constructions when it is desired to turn the tractor the operator depresses the foot pedal at one side or the other, as the case may be depending on which way the turn is to be made, thereby applying the brake to retard the traction wheel at that side. At the same time the speed of the traction wheel at the opposite side is accelerated by means of the differential mechanism causing the tractor to turn in the proper direction about the braked traction wheel as a center. In tractors of this type the operator regulates the sharpness of the turn desired to be made by the amount of pressure he applies to the brake pedal. However, in the use of tractors of this type, unless the operator turns the front dirigible wheels of the tractor proportionately to the turning of the tractor under the action of the brake mechanism, concurrently with the applying of pressure on the brake pedal, the proper turning movement of the tractor will be retarded, and the desired sharp turn may not be made. It will be seen therefore that quite a burden is placed on the operator having to manipulate the hand steering wheel sufficiently and rapidly enough to make the desired sharp turn, particularly at the time when the implement operated by the tractor reaches the end of the row, at which time the operator must also control the implement parts, such as raising the soil working tools of a cultivator or disconnecting the feeding devices of a planter, as the case may be.

With the above in view, the invention has for its principal object to provide improved means connecting the steering mechanism with the front dirigible wheels whereby the dirigible wheels are normally under the direct control of the operator through the steering mechanism, but which, upon operation of either brake pedal to cause the tractor to turn in one direction or the other, are automatically disconnected from such steering mechanism, whereby said dirigible wheels will function as caster wheels so as to readily follow the turning movement of the tractor under the action of the brake mechanism without any effort on the part of the operator, thus relieving him of the duty of turning such dirigible wheels by the hand steering wheel, and permitting him to give all his attention to the operation of the implement being operated by the tractor.

Other objects and advantageous features will be apparent from the following description of the invention taken in connection with the accompanying drawings, in which—

Figure 1 is a side view of a conventional type of tractor equipped with my improvement, and with the traction wheel at the near side removed so as to illustrate one of the brake pedals and the connection thereof with the steering means;

Figure 2 is a plan view thereof partly broken away to illustrate the connection between the brake pedal and brake mechanism at one side;

Figure 3 is a fragmentary sectional view through the front axle and lower end of the front truck;

Figure 4 is a vertical cross sectional view taken on the line 4—4 of Figure 2, illustrating the clutch for connecting and disconnecting the steering means and the spindle of the front truck in clutching engagement; and Figure 5 is a vertical sectional view taken on the line 5—5 of Figure 2 illustrating the clutch out of clutching engagement and the lever for operating said clutch.

Referring to the drawings, the tractor comprises a suitable main frame structure 6 which is supported at its rear end on two traction wheels 7 and 7a. The tractor motor is represented by the horizontal cylinder engine indicated at 8 from which power is transmitted through any conventional arrangement of clutch, selective speed transmission, differential mechanism and driving means to the rear traction wheels. The forward end of the tractor is supported by a suitable front truck provided with a pair of laterally spaced supporting and steering wheels 9 positioned relatively close together and the axles of said wheels are formed integrally with and extend laterally from the central member 11 of the truck.

Formed integrally with and extending forwardly from the member 11 of the truck adjacent its upper margin is an arm or bracket member 12. Suitably fixed to said member 12 adjacent its forward end is the lower end of a spindle 13 which extends upwardly through a tubular housing 14, the upper end of the latter being positioned between and rigidly secured to a pair of horizontally extending spaced parallel bars 16 rigidly bolted at 16a to the front end of the main frame of the tractor and extending forwardly therefrom, as shown in Figures 1 and 2. The arm 12 extending forwardly to its point of connection with the spindle 13 positions the transverse axis of rotation of the front dirigible wheels in rear of the axis of rotation of the spindle so that the dirigible wheels can act as caster wheels, as will be described later in detail. Suitable anti-friction bearing means 17 are interposed between the spindle 13 and the tubular housing 14 adjacent the lower end thereof, as shown in Figure 3. The spindle 13 extends upwardly beyond the upper end of the housing 14, and the upper portion of the spindle is enclosed in a tubular sleeve 18 having its lower end fixed to the upper end of the housing 14 as by bolts 19.

Rotation of the spindle 13 is normally controlled through a hand steering wheel 20, located adjacent the driver's seat at the rear of the tractor as shown in Figure 2, and a steering shaft 21 extending forwardly from said hand steering wheel to a point adjacent the upper end of the spindle 13. The rear end of the steering shaft 21 is journaled in a relatively long bearing sleeve 22 mounted on the upper end of a supporting standard 23 suitably secured at its lower end to the tractor adjacent the rear end thereof as shown in Figure 1. The forward end of the steering shaft 21 is journaled in bearings formed in the upper ends of spaced standards 24 and 25 bolted at their lower ends to the laterally extending portion of a plate 26. The plate 26 is provided with a downwardly extending circumferential flange 26a embracing the upper end of the sleeve 18, said flange being fixed to said sleeve by any suitable means. The plate 26 is also provided with a bearing opening 26b for the spindle 13. A worm 27 is fixed to the shaft 21 between the bearing standards 24 and 25 as shown in Figure 1, and such worm meshes with a worm wheel 28 journaled on the upper end of the spindle 13.

Rotation of the worm 28 by means of the hand steering wheel 20 normally causes rotation of the spindle 13 through the agency of a jaw clutch 29 which when engaged serves to connect the worm wheel 28 and the spindle 13. The clutch 29 comprises an upper member 31 and a lower member 32 and the upper member 31 is secured to the under face of the worm wheel 28 by means of bolts 33, as shown in Figures 4 and 5, while the lower member 32 of the clutch is free to slide on the spindle 13 axially thereof, but relative rotation between the lower member and said spindle is prevented by means of a key 34 engaging in a keyway 35 formed in the spindle 13 (see Figure 4). The lower clutch member 32 is normally held up in clutching engagement with the upper clutch member 31 by means of a coiled expansion spring 36 surrounding the spindle 13 and positioned between the plate 26 and the lower clutch member 32.

The clutch 29 is controlled by means of a bell crank lever 39. This bell crank lever comprises two similarly shaped flat members 39a and 39b secured together in juxtaposition by means of bolts 41 extending therethrough at spaced points as shown in Figure 5. Said bell crank is pivotally mounted at 42 on a bracket 43 fixed to a plate 44 which in turn is secured to the plate 26 by means of bolts 45 and extends forwardly therefrom. The horizontally extending portions of the members 39a and 39b constituting the bell crank lever 39 are bowed outwardly at an intermediate point (between the bolts 41 as shown in Figure 5) so that they embrace the hub 46 of the lower clutch member 32. Said members 39a and 39b carry bolts 47 and 48, the inner ends of which extend into a circumferential slot 49 provided in the hub 46, see Figure 4.

The upper end of the vertically extending arm of the bell crank lever 39 is connected by means of a link 51 with motion transmitting means in the form of a rock arm 52 fixed to and extending upwardly from a transversely extending rock shaft 53 rotatably supported in a U-shaped bracket 54 bolted or otherwise suitably secured to the tractor adjacent the rear end thereof as shown in Figures 1 and 2. The opposite ends of the rock shaft are bent to provide two rearwardly and upwardly extending crank arms 55 and 56, which arms are connected by means of cables 57 and 58, respectively, to two foot pedals 59 and 61, which control the brakes of the respective traction wheels 7 and 7a.

The means for driving the two traction wheels 7 and 7a and the means for operating the brakes thereof by the foot pedals 59 and 61 is the same and therefore a showing and description of but one of them will suffice. In Figure 2 the rear axle housing and the traction wheel 7 at the left hand side of the tractor are broken away to illustrate the driving means for the traction wheel 7, the brake acting in conjunction therewith and the means for operating the brake by the brake pedal 59. As such parts are conventional only, however, they will be but briefly described. The rear drive shaft is indicated by 62, and such shaft drives the wheel 7 through the instrumentality of a gear 63 keyed on said shaft adjacent its outer end, a chain 64 trained around said gear and around a second gear 65 fixed to said wheel. Keyed on the extreme outer end of said shaft 62 is a brake drum 66 within which is disposed a brake band 67 of the conventional expanding type which upon being expanded frictionally applies braking retardation on the inside of the drum and thence to the shaft 62 and traction wheel 7, as will be readily understood. The expansion and contraction of the brake band 67 is controlled by the rocking of a transversely extending shaft 68 suitably connected with the brake band and with the brake pedal 59. This shaft 68 is so connected with the foot pedal that upon downward pressure being applied to said pedal the shaft will be rocked to expand the brake band and retard or lock the wheel 7.

The operation of my improved tractor is as follows. When either brake pedal 59 or 61 is depressed to apply the brake to the associated traction wheel to make a sharp turn, the respective cable 57 or 58 will pull down on the associated arm 55 or 56, thus rocking the rock shaft 53 to swing the rock arm 52 rearwardly. This swinging of the rock arm 52 pulls the link 51 rearwardly, thus rocking the bell crank lever 39 on its pivot 42 to move the horizontally extending arm comprising the members 39a and 39b downwardly, whereby the bolts 47 and 48 carried by the members 39a and 39b and engaging in the circumferential groove in the hub 46 of the lower clutch member 42 will force such clutch member downwardly against the action of the spring 36 to release said lower clutch member from engagement with the upper clutch member. The spindle will thereby be disengaged from its connection with the arm on the steering shaft, permitting the spindle to turn freely in its bearings. Thus when one of the rear wheels is locked the power is diverted by the usual differential to the other wheel and this swings the tractor around the locked wheel as a center, and since the front wheels are disconnected from the manual steering means and swing freely about their vertical axes they function as caster wheels and align themselves automatically with the arc of turning.

When the turn is completed and the brake pedal released spring 36 forces the several parts to move in the reverse direction, thus bringing the two members of the clutch 29 again into engagement with each other and locking the spindle 13 in operative engagement with the hand steering mechanism, at which time it is necessary to straighten the front wheels, which is preferably accomplished by the operator turning the hand wheel 20 but with power again applied equally to both traction wheels 7 and 7a the front wheels 9 have a natural tendency to straighten, as a result of which the effort that the operator need expend in turning the hand wheel 20 to straighten the wheels 9 is almost negligible. The front wheels may also be straightened by momentarily locking or braking the opposite traction wheel, thus swinging the front end of the tractor just enough to bring the front wheels to a straight away position. Therefore the front dirigible wheels can be entirely controlled by power.

As the operator cannot see the front wheels from his seat at the rear of the tractor an indicator is provided which extends upwardly from the upper end of the spindle. This indicator is of sufficient height to be seen by the operator from his position on the seat of the tractor. Said indicator comprises a vertical arm 71 fixed at its lower end to the upper end of the spindle by means of a bolt 72, the arm having fixed at its upper end a horizontally extending member 73 in the form of an arrow or other indicating device. The indicator is fixed on the spindle so that the member 73 thereof extends in the direction of travel of the wheels, and therefore whenever the spindle is turned to turn the wheels the indicator will turn with the spindle so as to indicate to the operator the position of the wheels. By providing such indicator the operator will know in which direction to turn the hand steering wheel to straighten the wheels, and will also know when the wheels are properly straightened.

While I have illustrated my improvements incorporated in a tractor in which the front steering wheels are arranged close together, comparable to a three-wheel tractor as that is the preferred form, it is to be understood that in its broader aspects the invention contemplates the use of my invention in tractors equipped with widely spaced steering wheels.

I claim:

1. A tractor comprising a pair of traction wheels, separate brake mechanism for each of said wheels, a steering wheel, steering means including a pair of gears connected with said steering wheel, a brake pedal for actuating each of said brake mechanisms, and means comprising clutch elements connecting said brake pedals with said steering means and disposed between said pair of gears and said steering wheel whereby said steering means is automatically and simultaneously disconnected from said steering wheel upon actuation of either of said brake pedals.

2. A tractor comprising a pair of traction wheels, brake mechanism for each of said wheels, a steering wheel, steering means connected with said steering wheel, a brake pedal for actuating each of said brake mechanisms, a rock shaft, a crank arm rigidly connected with said rock shaft adjacent each of said brake pedals, a cable connecting each of said crank arms with the adjacent brake pedal whereby actuation of either of said brake pedals rocks said rock shaft, and means connected with said rock shaft and responsive to the rocking thereof operable to disconnect said steering means from said steering wheel.

3. A tractor comprising a pair of traction wheels, brake mechanism for each of said wheels, a steering wheel, steering means, a clutch operatively connecting said steering means with said steering wheel, a brake pedal for actuating each of said brake mechanisms, a transversely extending rock shaft supported adjacent said brake pedals, crank arms on said rock shaft connected respectively with said brake pedals whereby actuation of either of said brake pedals rocks said rock shaft, and means connecting said rock shaft with said clutch whereby rocking of said rock shaft operates said clutch to disconnect said steering means from said steering wheel.

4. A tractor comprising a pair of traction wheels, brake mechanisms for each of said wheels, a steering wheel, steering means, a clutch operatively connecting said steering means with said steering wheel, a brake pedal for actuating each of said brake mechanisms, a transversely extending rock shaft supported adjacent said brake pedals, crank arms on said rock shaft and connected respectively with said brake pedals whereby actuation of either of said brake pedals rocks said rock shaft, and means connecting said rock shaft with said clutch whereby rocking of said rock shaft operates said clutch to disconnect said steering means from said steering wheel, said means comprising a link operatively connected with said rock shaft and with said clutch.

5. A tractor comprising a pair of traction wheels, brake mechanisms for each of said wheels, a steering wheel, steering means, a clutch operatively connecting said steering means with said steering wheel, a brake pedal for actuating each of said brake mechanisms, a transversely extending rock shaft supported adjacent said brake pedals, crank arms formed integral with said rock shaft and connected respectively with said brake pedals whereby actuation of either of said brake pedals rocks said rock shaft, and means connecting said rock shaft with said clutch whereby rocking of said rock shaft operates said clutch to disconnect said steering means from said steering wheel, said means comprising an arm fixed to said rock shaft and movable therewith, and a longitudinally extending link connected with said arm and with said clutch.

6. A tractor comprising a pair of traction wheels, brake mechanism for each of said wheels, a steering wheel, steering means, a clutch operatively connecting said steering means with said steering wheel, a brake pedal for actuating each of said brake mechanisms, a transversely extending rock shaft supported adjacent said brake pedals, crank arms on said rock shaft connected respectively with said brake pedals whereby actuation of either of said brake pedals rocks said rock shaft, and means connecting said rock shaft with said clutch whereby rocking of said rock shaft operates said clutch to disconnect said steering means from said steering wheel, said means comprising an arm fixed to said rock shaft and movable therewith, a longitudinally extending link connected with said arm, and a bell crank lever connected with said link and with said clutch.

7. A tractor comprising a pair of traction wheels, brake mechanism for each of said wheels, a brake pedal for operating each of said brake mechanisms, a front truck comprising a wheel spindle provided at its lower end with supporting wheels, a clutch member journaled on the upper end of said spindle, a second clutch member keyed to said spindle below said first clutch member and normally held in clutching engagement therewith, steering means operatively connected with said first clutch member and adapted to transmit steering movement to said spindle through said clutch members, and means connected with said brake pedals and with said second clutch member operative upon actuation of either brake pedal to move said second clutch member out of clutching engagement with said first clutch member to disconnect said steering means from said spindle.

8. A tractor comprising a pair of traction wheels, brake mechanism for each of said wheels, a brake pedal for each brake mechanism operative upon pressure being applied to said pedal to operate said brake mechanism to apply the brake, steering wheel means, steering means connected with said steering wheel means, and means connecting said brake pedal with said steering means, said connecting means comprising a pair of normally interengaging clutch members operable upon pressure being applied to either of said brake pedals to move out of engagement with each other to disconnect said steering means from said steering wheel means and upon said pressure being released from said brake pedals to again move into engagement to connect said steering means with said steering wheel means.

9. A tractor comprising a pair of traction wheels, a separate brake mechanism for each of said wheels, a steering wheel, steering means connected with said steering wheel, a brake lever for actuating each of said brake mechanisms, a rock shaft, an arm on each end of said rock shaft connected respectively with said brake levers, and a single link extending forwardly from said rock shaft and operable to disconnect said steering means from said steering wheel.

10. A tractor comprising a pair of traction wheels, a separate brake mechanism including a lever for each of said wheels, a steering wheel, steering means connected with said steering wheel, a clutch for disconnecting said steering means from said steering wheel, motion transmitting means adjacent the brake levers and connected therewith for actuation by either of said levers, and a link connecting said motion transmitting means with said clutch and responsive to the movement of said motion transmitting means for actuating said clutch to disconnect said steering means from said steering wheel.

11. A tractor comprising a pair of traction wheels, a separate brake mechanism for each of said wheels, a steering wheel, steering means including a spindle connected with said steering wheel, a brake lever for actuating each of said brake mechanisms, a rock shaft, means for rocking said rock shaft by actuation of either of said brake levers, and means responsive to the rocking of said rock shaft operable to disconnect said steering means from said steering wheel, said means comprising a pair of clutch members, and a lever pivotally supported forward of the wheel spindle and connected with one of said clutch members and with said rock shaft for disconnecting said clutch members.

12. A tractor comprising a pair of traction wheels, a separate brake mechanism for each of said wheels, a steering wheel, steering means including a spindle connected with said steering wheel, a brake lever for actuating each of said brake mechanisms, a rock shaft, means for rocking said rock shaft by actuation of either of said brake levers, and means responsive to the rocking of said rock shaft operable to disconnect said steering means from said steering wheel, said means comprising a pair of clutch members, a lever pivotally supported forward of the wheel spindle and connected with one of said clutch members and with said rock shaft for disconnecting said clutch members, and a spring surrounding said wheel spindle operable to connect said clutch members responsive to the release of the pressure on said brake pedals.

THEOPHILUS BROWN.